US009860237B2

(12) United States Patent
Camenisch et al.

(10) Patent No.: US 9,860,237 B2
(45) Date of Patent: Jan. 2, 2018

(54) PASSWORD-BASED AUTHENTICATION IN SERVER SYSTEMS

(71) Applicant: International Business Machines Corporation, Armonk, NY (US)

(72) Inventors: Jan Camenisch, Rueschlikon (CH); Anja Lehmann, Rueschlikon (CH); Gregory Neven, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 14/878,933

(22) Filed: Oct. 8, 2015

(65) Prior Publication Data

US 2017/0104745 A1  Apr. 13, 2017

(51) Int. Cl.
*H04L 29/00* (2006.01)
*H04L 29/06* (2006.01)
*H04L 9/32* (2006.01)

(52) U.S. Cl.
CPC .......... *H04L 63/083* (2013.01); *H04L 9/3218* (2013.01); *H04L 9/3221* (2013.01);
(Continued)

(58) Field of Classification Search
CPC ................................................. G06F 2211/003
See application file for complete search history.

(56) References Cited

U.S. PATENT DOCUMENTS

| | | | | |
|---|---|---|---|---|
| 2002/0067832 | A1* | 6/2002 | Jablon | H04L 9/0844 380/277 |
| 2003/0221102 | A1* | 11/2003 | Jakobsson | H04L 9/0844 713/171 |
| 2003/0229788 | A1* | 12/2003 | Jakobsson | H04L 9/0844 713/171 |

OTHER PUBLICATIONS

MacKenzie, Philip, Thomas Shrimpton, and Markus Jakobsson. "Threshold password-authenticated key exchange." Annual International Cryptology Conference. Springer Berlin Heidelberg, 2002.*

(Continued)

*Primary Examiner* — Madhuri Herzog
(74) *Attorney, Agent, or Firm* — Scully, Scott, Murphy & Presser, P.C.; Daniel P. Morris, Esq.

(57) ABSTRACT

A system of λ≥2 servers is provided. The server system comprises an access control server for communication with user computers via a network and controlling access by the user computers to a resource in dependence on authentication of user passwords associated with respective user IDs, and a set of authentication servers for communication with the access control server via the network. In this system, at least each authentication server stores a respective key-share Ki of a secret key K which is shared between a plurality of the λ servers. The access control server is adapted, in response to receipt from a user computer of a user ID and an input password, to produce a hash value h via a first hash function operating on the input password. The access control server blinds the hash value h to produce a blinded hash value u, and sends the blinded hash value u via the network to at least a subset of the set of authentication servers. Each authentication server is adapted, in response to receipt of the blinded hash value u, to produce a hash response vi from the blinded hash value u and that server's key-share Ki, and to send the hash response vi via the network to the access control server. The access control server is further adapted to produce, using the hash response vi from each authentication server, an input password hash comprising a predetermined function of said hash value h and said secret key K. The access control server compares the input password hash with a corresponding user password hash, produced from the user password for the received user ID and pre-stored by the access control server, to determine whether the input password equals the user password, if so permitting access to the resource by the user computer.

19 Claims, 5 Drawing Sheets

(52) U.S. Cl.
CPC ........ *H04L 63/061* (2013.01); *H04L 63/0876* (2013.01); *H04L 63/101* (2013.01)

(56) References Cited

OTHER PUBLICATIONS

Jablon, David P. "Password authentication using multiple servers." Cryptographers' Track at the RSA Conference. Springer Berlin Heidelberg, 2001.*
Lee, Songwon, et al. "Threshold password-based authentication using bilinear pairings." EuroPKI. 2004.*

* cited by examiner

PASSWORD-BASED AUTHENTICATION IN SERVER SYSTEMS

BACKGROUND

The present invention relates generally to password-based authentication in server systems, and more specifically to password-based authentication in plural-server systems whereby access to a resource is controlled in dependence on authentication of user passwords by the server system.

Passwords are still the most prevalent mechanism for user authentication in data processing systems. In conventional password-based authentication systems, users connect to a server which controls access to the protected resource and maintains a database of user IDs, e.g. user names, with their associated user passwords stored in simple hashed form. If the access control server is compromised, however, user passwords are vulnerable to offline attacks using dictionaries or brute-forcing of the message space. As current graphical processors can test many billions of combinations per second, security should be considered lost as soon as an offline attack can be mounted against the password data.

To reduce exposure to offline attack through server compromise, password-based authentication can be performed by a plurality of servers. The authentication data can be split between multiple servers, and the user then interacts with all servers in the authentication protocol since information of all servers is required for authentication. This improves security as more than one server must be hacked for user passwords to be compromised. An example of a multi-server authentication system is described in "Round-optimal password-protected secret sharing and T-PAKE in the password-only model", Jarecki et al., ASIACRYPT 2014, Part II.

Resistance against server compromise is one thing, but knowing how to recover from such an event is another. Without secure recovery, all one can do in case of a detected breach is to re-initialize all servers with fresh cryptographic keys for the authentication protocol and request all users to reset their passwords. In cryptographic literature, recovery from compromise is known as proactive security or security against transient corruptions. Proactive security can be realized by letting the servers engage in an interactive refresh protocol to re-compute their keys.

SUMMARY

According to at least one embodiment of the present invention there is provided a system of $\lambda \geq 2$ servers. The server system comprises an access control server for communication with user computers via a network and controlling access by the user computers to a resource in dependence on authentication of user passwords associated with respective user IDs, and a set of authentication servers for communication with the access control server via the network. In this system, at least each authentication server stores a respective key-share $K_i$ of a secret key K which is shared between a plurality of the $\lambda$ servers. The access control server is adapted, in response to receipt from a user computer of a user ID and an input password, to produce a hash value h via a first hash function operating on the input password. The access control server blinds the hash value h to produce a blinded hash value u, and sends the blinded hash value u via the network to at least a subset of the set of authentication servers. Each authentication server is adapted, in response to receipt of the blinded hash value u, to produce a hash response $v_i$ from the blinded hash value u and that server's key-share $K_i$, and to send the hash response $v_i$ via the network to the access control server. The access control server is further adapted to produce, using the hash response $v_i$ from each authentication server, an input password hash comprising a predetermined function of said hash value h and said secret key K. The access control server compares the input password hash with a corresponding user password hash, produced from the user password for the received user ID and pre-stored by the access control server, to determine whether the input password equals the user password, if so permitting access to the resource by the user computer.

Further embodiments of the present invention provide access control and authentication servers of such systems and methods performed thereby.

Embodiments of the invention will be described in more detail below, by way of illustrative and non-limiting example, with reference to the accompanying drawings.

DETAILED DESCRIPTION

Figure 1:
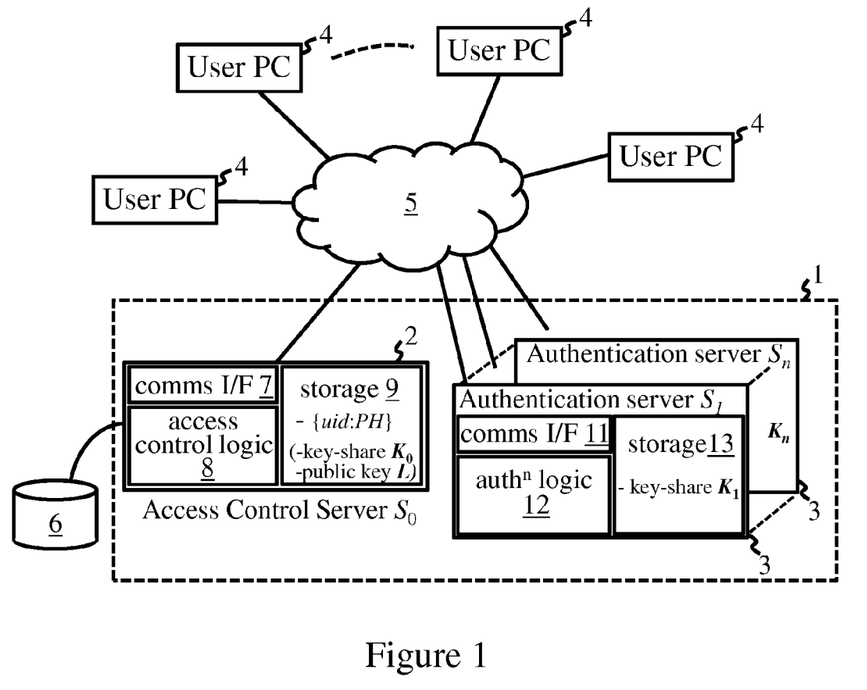
FIG. 1 is a schematic representation of a data processing system including a server system embodying the invention.

FIG. 1 is a schematic block diagram of a data processing system incorporating a server system 1 embodying the invention. The server system 1 comprises $\lambda \geq 2$ servers. These include an access control server 2, denoted by $S_0$, and a set of $n \geq 1$ authentication servers 3, denoted by $S_1$ to $S_n$. The access control server 2 is adapted for communication with the authentication servers 3 and a plurality of user computers 4 via a network 5. The network 5 may in general comprise one or more component networks and/or internetworks, including the Internet. The user computers 4 are shown as general-purpose personal computers (PCs) in this example, but may equally be implemented by other computer devices such as mobile phones, tablet computers, personal music players, palmtop devices, etc. The n authentication servers 3 are adapted to cooperate with the access control server 2 to implement a password authentication protocol detailed below. In particular, access control server 2 controls access by user computers 4 to a resource, in this example a database 6. Access is permitted in dependence on authentication of user passwords associated with respective user IDs, e.g. user names, which are input by users via PCs 4 in operation.

The number n of authentication servers can vary for different embodiments. In preferred embodiments, n>1 whereby system 1 comprises $\lambda \geq 3$ servers. In general, higher values of n offer greater system security, and the value of n can be selected as desired depending on the particular password authentication protocol and required level of security. The authentication servers 3 may be located at the same location as access control server 2 or at one or more different locations, and may be controlled by the same entity as the access control server or by one or more different entities. Distribution and control of the servers 2, 3 can thus be selected according to security requirements for a given system.

A high-level abstraction of functional components of the servers 2, 3 is shown in FIG. 1. Access control server 2 is indicated as comprising a communications interface (I/F) 7 for communications via network 5, access control logic 8, and storage 9. The access control logic 8 provides functionality for implementing steps of the password authentication and related operations detailed below. In general, this control logic can be implemented in hardware or software or a combination thereof. Storage 9 stores various data used by the control logic 8 in operation. This includes a password data set {uid:PH} containing a user password hash PH, the construction of which is detailed below, for the user ID uid of each registered user of the authentication system. In preferred embodiments the access control server also stores a key-share $K_0$ of a secret key K, and a public key L of a cryptographic key-pair, discussed further below. Each authentication server 3 is similarly shown as comprising a communications interface 11, authentication logic 12 and storage 13. The authentication logic 12 (which can again be implemented in hardware or software or a combination thereof) provides functionality for use in the password authentication and related operations below. Storage 13 stores data used by authentication logic 12 in operation. In particular, at least each authentication server $S_1$ to $S_n$ stores a respective key-share $K_i$ of a secret key K which is shared between a plurality of the λ servers $S_i$ (i=0 to n) of system 1. Hence, in systems where λ=2, the access control server $S_0$ necessarily stores a key-share $K_0$. In systems where n>1, at least each of the n authentication server $S_1$ to $S_n$ stores a respective key-share $K_1$ to $K_n$, and access control server $S_0$ preferably also stores a key-share $K_0$. The key-sharing scheme, examples of which will be described below, is such that the secret key K for the authentication protocol can be reconstructed in operation from a combination of key-shares $K_i$.

Each of the functional blocks of servers 2, 3 in FIG. 1 may be implemented in general by one or more functional components which may be provided by one or more computers. In particular, each of servers 2, 3 may be implemented by computing apparatus comprising one or more general- or special-purpose computers, each comprising one or more (real or virtual) machines, providing functionality for implementing the operations described herein. Exemplary implementations will be described further below. The access control and authentication logic 8, 12 of these servers may be described in the general context of computer system-executable instructions, such as program modules, executed by a computing apparatus. Generally, program modules may include routines, programs, objects, components, logic, data structures, and so on that perform particular tasks or implement particular abstract data types. The computing apparatus may be practiced in distributed cloud computing environments where tasks are performed by remote processing devices that are linked through a communications network. In a distributed cloud computing environment, data and program modules may be located in both local and remote computer system storage media including memory storage devices.

Figure 2:
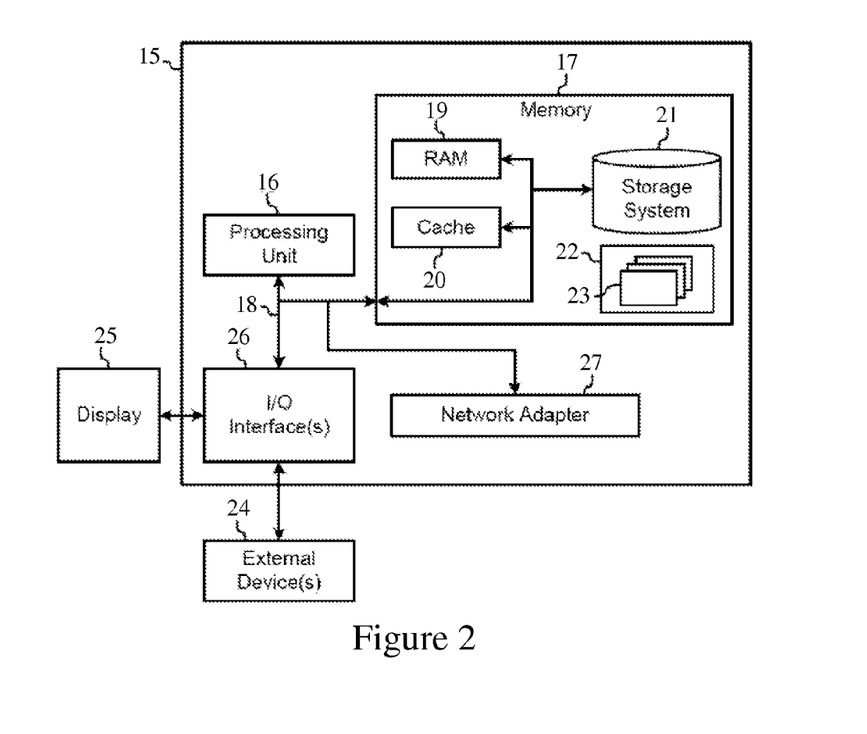
FIG. 2 is a generalized schematic of a computer in the server system of FIG. 1.

FIG. 2 is a block diagram of exemplary computing apparatus for implementing a computer of server system 1. The computing apparatus is shown in the form of a general-purpose computer 15. The components of computer 15 may include processing apparatus such as one or more processors represented by processing unit 16, a system memory 17, and a bus 18 that couples various system components including system memory 17 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 15 typically includes a variety of computer readable media. Such media may be any available media that is accessible by computer 15 including volatile and non-volatile media, and removable and non-removable media. For example, system memory 17 can include computer readable media in the form of volatile memory, such as random access memory (RAM) 19 and/or cache memory 20. Computer 15 may further include other removable/non-removable, volatile/non-volatile computer system storage media. By way of example only, storage system 21 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 18 by one or more data media interfaces.

Memory 17 may include at least one program product having one or more program modules that are configured to carry out functions of embodiments of the invention. By way of example, program/utility 22, having a set (at least one) of program modules 23, may be stored in memory 17, as well as an operating system, one or more application programs, other program modules, and program data. Each of the operating system, one or more application programs, other program modules, and program data, or some combination thereof, may include an implementation of a networking environment. Program modules 23 generally carry out the functions and/or methodologies of embodiments of the invention as described herein.

Computer 15 may also communicate with: one or more external devices 24 such as a keyboard, a pointing device, a display 25, etc.; one or more devices that enable a user to interact with computer 15; and/or any devices (e.g., network card, modem, etc.) that enable computer 15 to communicate with one or more other computing devices. Such communication can occur via Input/Output (I/O) interfaces 26. Also, computer 15 can communicate with one or more networks such as a local area network (LAN), a general wide area network (WAN), and/or a public network (e.g., the Internet) via network adapter 27. As depicted, network adapter 27 communicates with the other components of computer 15 via bus 18. It should be understood that although not shown, other hardware and/or software components could be used in conjunction with computer 15. Examples include, but are not limited to: microcode, device drivers, redundant processing units, external disk drive arrays, RAID systems, tape drives, and data archival storage systems, etc.

Figure 3:
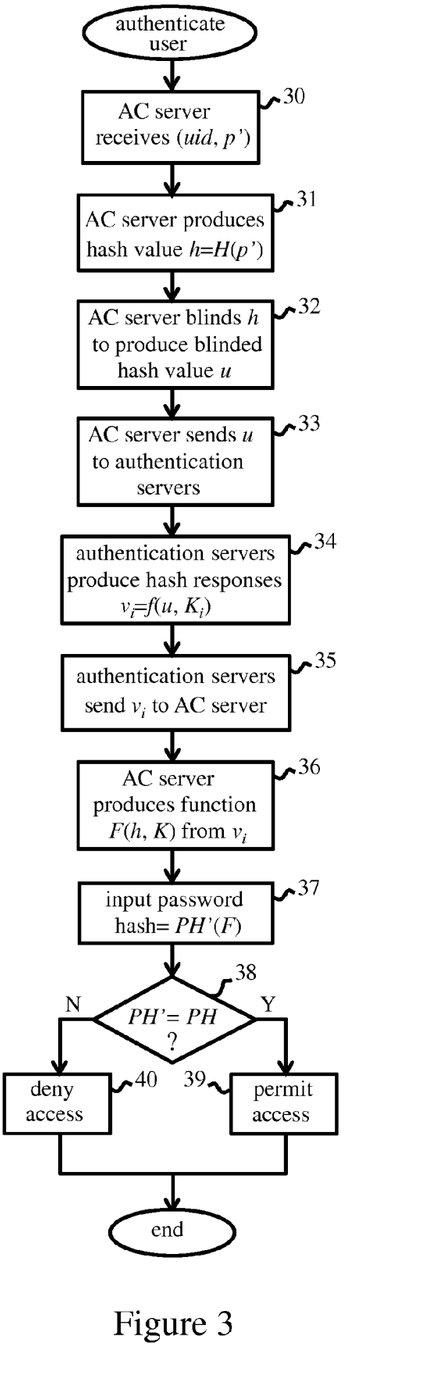
FIG. 3 indicates steps performed in an authentication operation of the server system.

FIG. 3 gives an overview of the main steps performed by server system 1 in an authentication operation. The authentication procedure is initiated when a user connects to access control server (AC server) 2 from a user computer 4 over network 5. The user supplies his user ID uid and an input password p' (i.e. an attempt at his user password p as previously registered with the AC server in a setup procedure detailed below). The login data (uid, p') is received by AC server 2 in step 30 of FIG. 3. In step 31, the control logic 8 of AC server 2 produces a hash value h via a first hash function H operating on (at least) the input password p'. In step 32, the control logic 8 blinds the hash value h to produce a blinded hash value u. (Blinding is a widely-used cryptographic procedure whereby a message can be hidden, or blinded, by encoding the message using a selected function, typically combining the message with a random value such as a nonce). In step 33, the access control server 2 sends the blinded hash value u via the network to at least a subset of the set of n authentication servers 3.

In response to receipt of the blinded hash value u, the authentication logic 12 of each authentication server 3 produces a hash response $v_i$ as indicated at step 34. This hash response $v_i$ is produced from (at least) the blinded hash value u and that server's key-share $K_i$ of the secret key K. The hash response $v_i$ is denoted in step 34 by $f(u, K_i)$, where $f$ is some function of which examples are given below. In step 35, each authentication server sends its hash response $v_i$ back to AC server 2 via the network.

On receipt in step 36, the control logic 8 of AC server 2 uses (at least) the hash responses $v_i$ to produce a predetermined function F of the aforementioned hash value h and the secret key K. In this computation, the key-shares $K_i$ needed to reconstruct the key K are combined to produce the function F of h and K. These key-shares comprise the key-share $K_i$ encoded in each hash responses $v_i$ from an authentication server, and may also include the AC server's own key-share $K_0$ where provided. An input password hash PH', comprising (at least) the function F(h, K), is produced as indicated at step 37. While the input password hash PH' may simply be the function F(h, K) here, preferred embodiments further encode F(h, K) to produce PH' as illustrated by examples below. Next, the access control logic 8 compares the input password hash PH' with a corresponding user password hash PH pre-stored in storage 9 for the received user ID uid. The user password hash PH is produced in corresponding manner from the user password p registered for uid in a setup operation for the user account. The setup operation, described below, thus includes steps which correspond generally to steps 30 to 37 above to produce the user password hash PH from the user password p. If the input password hash PH' matches the user password hash PH, as indicated by a "Yes" (Y) at decision block 38, then the input password p' equals the user password p. In this case, the AC server 2 permits the user computer access to the database 6 as indicated at step 39, and the login process in complete. If the input password p' does not equal the user password p, then the password hashes PH' and PH will not match, giving decision "No" (N) at block 38. The AC server 2 then denies access at step 40 and may notify the user accordingly.

In the above process, the number of authentication servers to which the blinded hash value u is sent in step 33 may depend on the nature of the key-sharing scheme. In particular, some schemes (so called "n-out-of-n" schemes where "n" here is the total number of key-shares $K_i$) require all key-shares $K_i$ in order to reconstruct the shared key K. In this case, the blinded hash value will be sent to all authentication servers. Other key-sharing schemes are so-called threshold (or "t-out-of-n") schemes in which only a threshold number t of key-shares, (where t can be less than the total number n of key-shares) are required to reconstruct the key K. In this case, the blinded hash value u may be sent to a subset of t (or (t−1) if the access control server holds a key-share $K_0$) authentication servers.

The above scheme provides the basis for highly efficient, secure password authentication procedures in which proactive security can be achieved by simple redistribution (or "refresh") of the key-shares $K_i$. Since the password hash PH is a function of the shared key K, offline attacks on any given server cannot compromise the user password. The key-shares can be refreshed in such a way that the overall secret key K is unchanged, so no re-computation of the pre-stored PH value is required. Preferred embodiments detailed below provide a simple, non-interactive key-refresh procedure whereby key-shares can be refreshed unilaterally by each server, i.e. without requiring communication between the servers. The key-shares here can be based on sets of master keys stored by respective servers. Such master keys can be readily protected in operation of the system, and can also be used in an elegant scheme for blinding hash responses of the authentication servers. This enhances security of the system, providing proactive security over arbitrarily many key-refresh procedures. The password authentication process is distributed over a plurality of servers, enhancing security against offline attacks, yet the user need only interact with a single server, i.e. the access control server. The password verification is a single-round protocol which can be implemented in a highly efficient manner. Registration of user passwords on setup of user accounts can also be achieved via an efficient setup procedure. The preferred setup operation further allows simple verification of correct computation of the user password hashes on which successful login subsequently depends.

Figure 4:
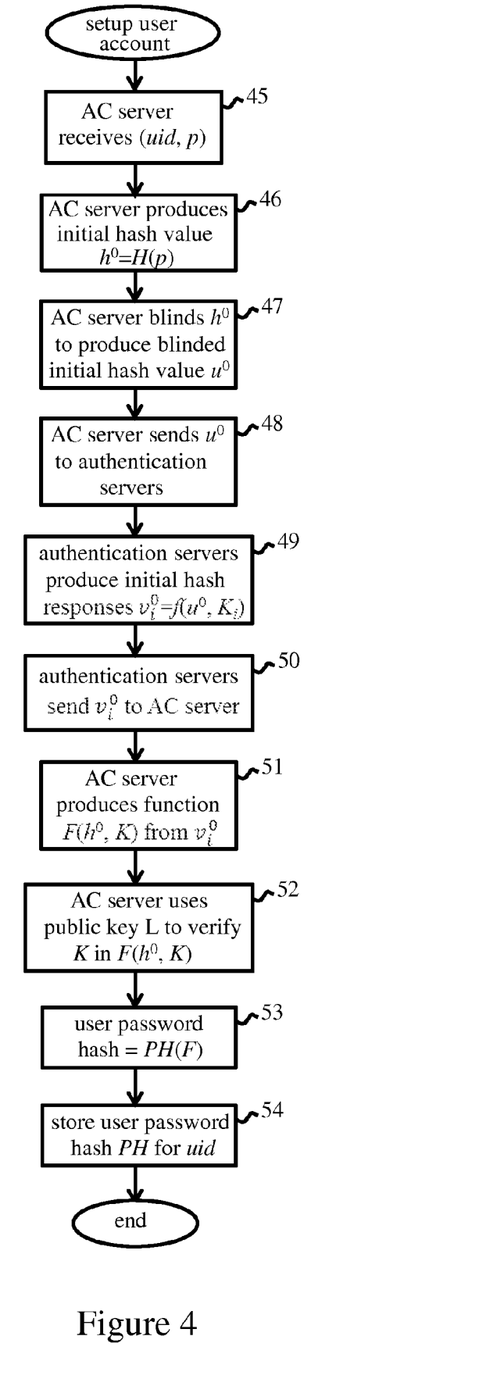
FIG. 4 indicates steps performed in a setup operation of the server system.

FIG. 4 gives an overview of the preferred setup operation including the aforementioned verification step. To permit this verification, the secret key K for system 1 comprises the secret key of a cryptographic key-pair (L, K), where L is the public key of the key-pair. This public key L is stored by AC server 2 as indicated above. To initiate the setup operation for a user account, the user supplies his user ID uid and a user password p to the AC server 2. The user data (uid, p) is received by AC server 2 in step 45 of FIG. 4. In step 46, the control logic 8 produces an initial hash value $h^0$. This value $h^0$ is produced in corresponding manner to the hash value h in step 31 of FIG. 3, i.e. by applying the first hash function H to (at least) the user password p. In step 47, the initial hash value $h^0$ is blinded as in step 32 above to produce a blinded initial hash value $u^0$. In step 48, the blinded initial hash value $u^0$ is sent to to at least a subset of the n authentication servers 3. In step 49, the authentication logic 12 of each authentication server produces an initial hash response $v_i^0$, in like manner to step 34 above, as $f(u^0, K_i)$. Each authentication server sends its initial hash response $v_i^0$ back to AC server 2 in step 50. In step 51, the control logic 8 of AC server 2 uses the initial hash responses $v_i^0$ to produce the function $F(h^0, K)$ of the initial hash value $h^0$ and secret key K in like manner to step 36 above. Next, in step 52, the control logic 8 uses the public key L to verify correctness the secret key K in the function $F(h^0, K)$. This can be done in various ways depending on the particular protocol construction. In some embodiments, the AC server communicates with the authentication servers which provided initial hash responses $v_i^0$ in step 49 to implement a zero-knowledge proof using the public key L. In other embodiments, the control logic 8 can simply verify that the public key L and the function $F(h^0, K)$ satisfy a bilinear map. Examples of both constructions are given below. In step 53, the user password hash PH, comprising the function $F(h^0, K)$, is produced as in step 37 above. The user password hash PH is stored for the uid in the password data set of storage 9 in step 54. The setup procedure for the user is then complete.

The verification operation of step 52 above ensures that the authentication servers have behaved honestly in computation of their initial hash responses $v_i^0$, using the correct key-shares $K_i$, and hence that the user password hash PH is a correct function of the user password p and secret key K. Without this step, successful login for a user account would be impossible. However, additional verification of the input password hash PH' during subsequent logins is unnecessary. Mismatch of the password hashes PH' and PH in step 38 of the login procedure indicates either that the input password p' is incorrect, or that an authentication server has not supplied a valid hash response $v_i$, suggesting system compromise. In both cases login is justifiably refused.

A simple embodiment of the above procedure can be implemented as follows. A straightforward way to secret-share a secret key K, being an element of a group G, among servers $S_0, \ldots, S_n$ is to choose random key-shares $K_1, \ldots, K_n \leftarrow_r G$ and set $$K_0 \leftarrow K - \sum_{i=1}^{n} K_i.$$

Each server $S_i$ is given a key-share $K_i$. The key K can then be reconstructed as $$K \leftarrow \sum_{i=0}^{n} K_i.$$

Steps 31 to 37 of FIG. 3 can be performed as follows.

Step 31: the hash value h is computed as h=H(uid, p').

Step 32: control logic 8 selects a random nonce N and computes the blinded hash value u as $$u = h^N = H(uid, p')^N.$$

Step 34: each authentication server computes is hash response $v_i$ as $v_i = u^{K_i}$.

Step 36: control logic 8 computes $v_0 = u^{K_0}$ and computes v=F(h,K) as $$v = \prod_{i=0}^{n} v_i^{\frac{1}{N}} = \prod_{i=0}^{n} u^{\frac{K_i}{N}} = H(uid, p')^{\Sigma K_i} = h^K.$$

Step 37: control logic 8 computes the input password hash PH' via a second hash function G operating on the function F(h, K)=v, in this case together with the input password p' and the user ID uid, as $$PH' = G(uid, p', v) = G(uid, p', H(uid, p')^{\Sigma K_i}) = G(uid, p', h^K).$$

The equivalent steps of FIG. 4 can be performed in a corresponding manner to compute the user password hash PH from user password p.

To provide security against transient corruptions, the servers $S_i$ refresh their key-shares $K_i$ for each of successive time periods in operation of the system. In preferred implementations of this refresh process, each server $S_i$ adds a random share of a predetermined value, most conveniently zero, to its current key-share. The sum of the key-shares $$\sum_{i=0}^{n} K_i = K$$

thus remains the same, and the user password hash remains valid. The time periods, or "epochs", for which the key-shares are refreshed may be defined in various ways in the system. For example, the refresh operation may be performed automatically for epochs of a predetermined duration, and/or a new epoch may be initiated in response to detection of an attack on system 1. In the preferred embodiments to follow, the refresh operation is a simple, non-interactive process, performed unilaterally by each server, in which the key-shares are based on sets of master keys stored by the servers. These master keys also form the basis for a clever system of blinding hash responses of the authentication servers. This blinding system allows keys to be refreshed over arbitrarily many epochs, providing continued security against transient corruptions, while avoiding the need for servers to commit to their key-shares. To protect these master keys, in preferred embodiments of system 1, each server $S_i$ storing a key-share $K_i$ comprises a first and second server compartments. The first server compartment is connectable to network 5 and is operable, though communication with other servers $S_i$ as described above, to implement the authentication protocol. The second server compartment stores the set of master keys for the server and is inaccessible from network 5 in operation of the authentication protocol. This server compartment can be protected from network 5 by hardware and/or software mechanisms which inhibit unauthorized access to the compartment from the network in operation of the protocol. A preferred implementation for the servers $S_i$ will now be described with reference to FIG. 5.

Figure 5:
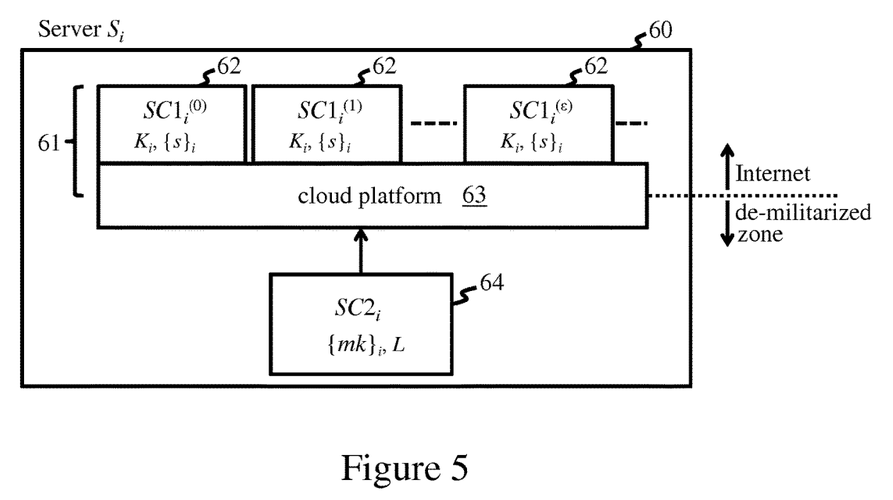
FIG. 5 is a schematic representation of an exemplary server implementation for the FIG. 1 system.

In server 60 of FIG. 5, the first server compartment 61 comprises a virtual machine 62, denoted by $SC_i^{(\epsilon)}$ (where $\epsilon=0, 1, 2$, etc., indicates epoch number), running on a cloud computing platform 63. A fresh virtual machine $SC1_i^{(0)}$, $SC1_i^{(1)}$, $SC1_i^{(2)}$, etc., is initiated on platform 63 for each of successive epochs $\epsilon=0, 1, 2, \ldots$, etc., in operation. Cloud platform 63 may in general comprise one or more computers each supporting one or more virtual machines. In a typical implementation, the cloud platform 63 can be realized by a single physical machine or a cluster of physical machines. The second server compartment 64, denoted by $SC2_i$, comprises a single physical machine in this embodiment. This machine is connected only to the cloud software platform, and such connections can be physically isolated from the network 5 (here assumed to be the Internet) via which the virtual machines 62 communicate. In particular, the virtual machines $SC1_i^{(0)}$, $SC1_i^{(1)}$, ..., $SC1_i^{(\epsilon)}$, ..., are exposed to the Internet, while the cloud platform 63 and second compartment $SC2_i$ are run in a protected environment (the "de-militarized zone"), i.e. behind one or more firewalls deployed in the cloud platform. The second compartment $SC2_i$ is thus inaccessible from the Internet in normal operation of the authentication protocol, and is therefore protected from unauthorized Internet access. (Authorized access may of course be possible if required, e.g. for setup purposes prior to operation).

The second server compartment $SC2_i$ of server 60 stores a set of master keys, denoted by $\{mk\}_i$ in the figure, for the server $S_i$, together with the public key L discussed above. The key set $\{mk\}_i$ may in general comprise one or more master keys, one or more of which may be common to one or more other servers $S_j$ as explained below. The first server compartment $SC1_i$ stores that server's current key-share $K_i$ of the secret key K, together with a set of blinding seeds, denoted by $\{s\}_i$, discussed further below.

The master key sets $\{mk\}_i$ and initial key-shares $K_i$ for servers $S_i$ may be provided in an initialization operation of the system. This initialization might be performed in various ways. For example, the master keys $\{mk\}_i$ could be generated independently, e.g. by a system controller, and communicated to individual servers $S_i$ via some secure message transmission functionality $F_{smt}$. In embodiments below, one dedicated server, here AC server $S_0$, generates all master key sets $\{mk\}_i$ which are then communicated to other servers via the secure message transmission functionality $F_{smt}$. This communication may, for example, be implemented by writing the initialization data to a physical medium (such as a USB drive, disc, etc.) which is distributed to server locations by courier and loaded to the servers by an operator. In some embodiments, master keys may even be short enough to be written on paper and entered manually to the servers. Alternatively, for example, the message transmission functionality $F_{smt}$ may comprise a secure transmission channel established via a standard security protocol such as TLS (Transport Security Layer) or SSL (Secure Sockets Layer). While the initialization data could include the initial key-shares $K_i$, and blinding seeds $\{s\}_i$, in the embodiments below this initial data can be generated by the second server compartments $SC2_i$.

With the implementation of FIG. 5, server 60 can exploit inherent features of modern cloud computing platforms such as, for instance, the Openstack platform. Such platforms offer strong separation between the virtual machines which are exposed to the Internet, and are thus subject to attacks, and the cloud management interfaces that run in the demilitarized zone. New virtual machines can be created on the fly from images, machines can be shut down, and the routing of traffic to machines can be dynamically configured. The platforms can also virtualize the storage for the virtual machines, offering different kinds of abstraction of hard-disks (such as file system, block store, object store, etc.). System setup can be managed as a manual process via a web interface in the de-militarized zone. However, system management operations can easily be automated with scripts to replace manual interaction with software-based control.

In operation of system 1 with the server implementation of FIG. 5, the $\lambda$ virtual machines $SC1_i^{(2)}$ first server compartments 61 communicate to implement the authentication protocol. Time is divided into epochs separated by key refresh procedures performed by the servers. For each epoch $\epsilon$, a fresh virtual machine $SC1_i^{(2)}$ is set up, booted, and run on the cloud platform 63 at each server. These machines $SC1_i^{(2)}$ run the setup and login procedures of authentication protocol, and read and write their states from the virtual storage provided to them by cloud platform 63. The second compartment $SC2_i$ of each server 60 controls the cloud platform 63, maintains the images for the virtual machines $SC1_i^{(2)}$, and prepares the state (stored operating data) that is given to each $SC1_{i\ (2)}$ in order for it to run the protocol procedures.

Operation of a preferred embodiment using servers 60 will now be described with reference to FIGS. 6 through 9.

Some preliminaries are described first to assist understanding of the embodiment to follow.

Combinatorial Secret Sharing. A straightforward way to create n-out-of-n secret shares of the unity element in a group G among parties $P_1, \ldots, P_n$ is to choose shares $\alpha_1, \ldots, \alpha_n \leftarrow_R G$ and set $$a_1 \leftarrow \frac{1}{\prod_{i=2}^{n} a_i}.$$

Each party $P_i$ is given a secret share $\alpha_i$. They are correct shares of one because $$\prod_{i=1}^{n} a_i = 1.$$

An observation underlying the embodiment below is that the same shares $\alpha_1, \ldots, \alpha_n$ can be computed in a different way, by choosing ${}^b[i,j] \leftarrow_R G$ for all $1 \leq i < j \leq n$ and handing $({}^b[i,j])_{j=1, j \neq i}$ to $P_i$ for $i=1, \ldots, n$. Note that there is a share ${}^b[i,j]$ for each pair of parties $\{P_i, P_j\}$, and that this share is known only to $P_i$ and $P_j$. Party $P_i$ computes its share of unity $$a_i \leftarrow \prod_{j=1, j \neq i}^{n} b_{[i,j]}^{\Delta_{i,j}},$$

where $\Delta_{i,j}=1$ if $i<j$ or $\Delta_{i,j}=-1$ otherwise. One can easily see that $$\prod_{i=1}^{n} a_i = \prod_{i=1}^{n} \prod_{j=1, j \neq i}^{n} b_{[i,j]}^{\Delta_{i,j}} = \prod_{i=1}^{n} \prod_{j=i+1}^{n} b_{[i,j]} \cdot b_{[i,j]}^{-1} = 1$$

The embodiment below exploits this technique for generating blinding factors $\beta_0, \ldots, \beta_n$ as random shares of unity by letting the ${}^b\{i,j\}$ be generated pseudorandomly from a master key that is known only to servers $S_i$ and $S_j$. Similarly, random shares $\delta_1, \ldots, \delta_n$ of zero can be obtained by choosing $\delta_2, \ldots, \delta_n \leftarrow_R G$, setting $$\delta_l \leftarrow -\sum_{i=2}^{n} \delta_i,$$

and giving $\delta_i$ to $P_i$, whereby $$\sum_{i=1}^{n} \delta_i = 0.$$

Each party $P_i$ can compute its share of zero $\delta$ as $$\delta_i \leftarrow \sum_{j=1, j \neq i}^{n} \Delta_{i,j} \cdot b_{[i,j]},$$

where represents multiplication and $\Delta_{i,j}$ is as defined above. Here it can be seen that $$\sum_{i=1}^{n} \delta_i - \sum_{i=1}^{n} \sum_{j=1, j \neq i}^{n} \Delta_{i,j} \cdot b_{[i,j]} - \sum_{i=1}^{n} \sum_{j=i+1}^{n} (b_{[i,j]} - b_{[j,i]}) = 0$$

This technique, in which the $b_{[i,j]}$ are generated pseudorandomly from a master key known only to servers $S_i$ and $S_j$, is used to enable each server $S_i$ to unilaterally update its key-share $K_i$ in the embodiment below.

Figure 6:
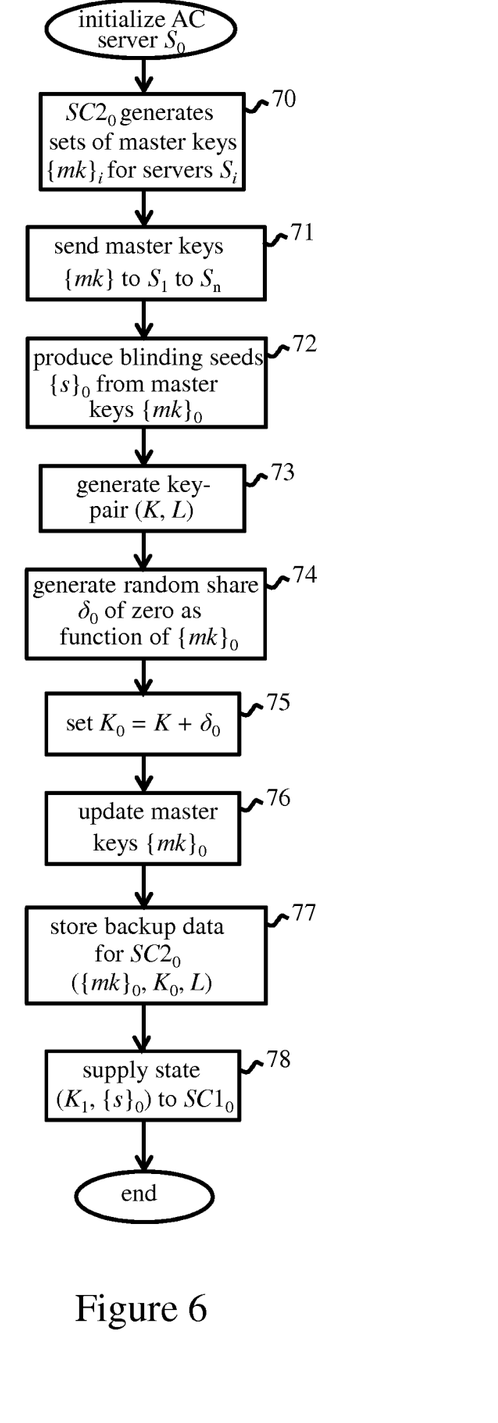
FIGS. 6 and 7 indicate steps performed by servers in an initialization procedure of one embodiment.
Figure 7:
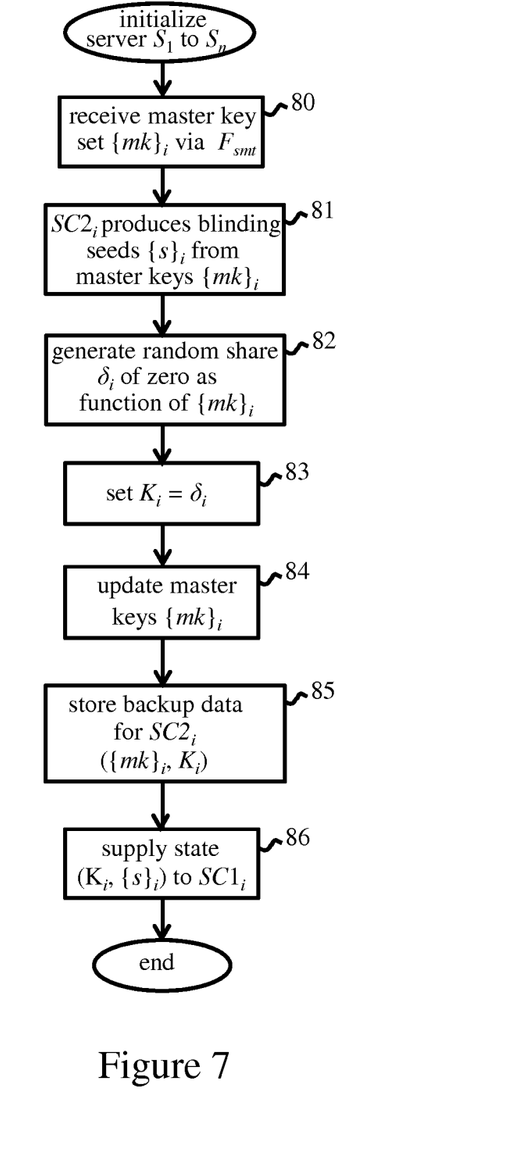

FIGS. 6 and 7 indicate an initialization procedure for servers $S_i$ in this embodiment. (Note that steps may be performed in a different order to that shown, and some steps may be performed concurrently as appropriate). It is assumed in this example that all servers $S_0, \ldots, S_n$ store a key-share $K_i$ of the secret key K. One dedicated server, here AC server $S_0$, performs the initialization steps indicated in FIG. 6. In this process, the second server compartment $SC2_0$ of server $S_0$, generates and distributes a set of master keys $\{mk\}_i$ for all servers $S_0, \ldots, S_n$ in the system. It also generates a secret key K for a joint public key L. $SC2_0$ uses its master keys $\{mk\}_0$ to compute its own initial key-share $K_0$ of K and an initial set of blinding seeds $\{s\}_0$. The key-share $K_0$ and blinding seeds $\{s\}_0$ form part of the initial state $st_0$ of the first server compartment $SC1_0$ of $S_0$. The master keys for $S_0$ form part of the stored data $backup_0$ held in memory of second server compartment $SC2_0$.

In step 70 of FIG. 6, the second server compartment $SC2_0$ of AC server 2 generates the master key sets for servers $S_i$ as $\{mk\}_i = (\{mk_{\{i,j\}}\})_{j=0, j \neq i}^{n}$ for all $0 \leq i < j \leq n$. Each master key set $\{mk\}_i$ for server $S_i$ thus contains a respective master key $mk_{i,j}$ common to each other server $S_j$ storing a key-share of the secret key K. The master key $mk_{i,j}$ will be known only to servers $S_i$ and $S_j$ so that each pair of servers $\{i,j\} \subseteq \{0, \ldots, n\}$ will have a common master key that is unknown to other servers.

In step 71, the sets of master keys $\{mk\}_i$ are securely distributed to the other servers $S_i$ (i=1 to n) via the secure message transmission functionality $F_{smt}$ discussed above.

In step 72, the second server compartment $SC2_0$ produces its set of blinding seeds $\{s\}_0 = (\{s_{\{o,j\}}\})_{j=1}^{n}$. Each blinding seed $s_{o,j}$ is produced from a respective master key $mk_{o,j}$ of the AC server's master key set $\{mk\}_0$. In this preferred embodiment, each blinding seed $s_{o,j}$ comprises a pseudorandom function of a respective master key $mk_{o,j}$.

In step 73, the second server compartment $SC2_0$ generates the secret key K and public key L of the key-pair (L, K) for system 1. In step 74, $SC2_0$ generates its random share $\delta_0$ of zero from its master key set $\{mk\}_0$. This step, detailed further below, uses the above combinatorial secret sharing technique to compute $\delta$ as a combination of pseudorandom functions of respective master keys $mk_{o,j}$. In step 75, $SC2_0$ generates the initial key-share $K_0$ for AC server $S_0$ by setting $K_0 \leftarrow K + \delta_0$.

In step 76, the second server compartment $SC2_0$ updates its set of master keys $\{mk\}_0$ ready for the first epoch of the authentication protocol. (In practice, this step may be performed in conjunction with blinding seed production in step 72 as illustrated by the example to follow). Each updated master key comprises a function of the corresponding initial master key $mk_{o,j}$ produced in step 70 above. In this preferred embodiment, the updated master key comprises a pseudorandom function of the initial master key $mk_{o,j}$. The resulting updated master keys constitute the master key set $\{mk\}_0 = (\{mk_{\{o,j\}}\})_{j=1}^{n}$ for the first epoch.

In step 77, $SC2_0$ stores its backup data $backup_0$ as $backup_0 \leftarrow (K_0, L, \{mk\}_0 = (\{mk_{\{o,j\}}\})_{j=1}^{n})$. In step 78, $SC2_0$ supplies the initial key-share $K_0$, the public key L and the set of blinding seeds $\{s\}_0$ to the first server compartment $SC1_0$ as part of the state $st_0$ which is set to $st_0 = (K_0, L, \{s\}_0 = (\{s_{\{o,j\}}\})_{j=1}^{n})$. The initialization of AC server 2 is then complete.

FIG. 7 indicates the initialization procedure for each of the other servers $S_i$, here each authentication server $S_1$ to $S_n$ of system 1. In this process, the server $S_i$ receives and stores its set of master keys $\{mk\}_i$ in memory of second server compartment $SC2_i$, and generates its initial key-share $K_i$ and set of blinding seeds $\{s\}_i$. The initial key-share $K_i$ and blinding seeds $\{s\}_i$ form part of the initial state $st_i$ of the first server compartment $SC1_i$ of server $S_i$.

In step 80, the second server compartment $SC2_i$ receives its set of master keys $\{mk\}_i = (\{mk_{\{i,j\}}\})_{j=0, j \neq i}^{n}$ via $F_{smt}$.

In step 81, the second server compartment $SC2_i$ produces its set of blinding seeds $\{s\}_i = (\{s_{\{i,j\}}\})_{j=0, j \neq i}^{n}$. Each blinding seed $s_{i,j}$ is produced from a respective master key $mk_{i,j}$ of the server's master key set $\{mk\}_i$, here as a pseudorandom function of that master key.

In step 82, $SC2_i$ generates its random share $\delta_i$ of zero from its master key set $\{mk\}_i$ using the combinatorial secret sharing technique to compute $\delta_i$ as a combination of pseudorandom functions of respective master keys $mk_{i,j}$. This is explained further below. In step 83, $SC2_i$ generates the initial key-share $K_i$ for server $S_i$ by setting $K_i \leftarrow \delta_i$.

In step 84, $SC2_i$ updates its set of master keys $\{mk\}_i$ ready for the first epoch in corresponding manner to step 76 above. Each updated master key thus comprises a pseudorandom function of the corresponding initial master key $mk_{i,j}$, and the resulting updated master keys constitute the master key set $\{mk\}_i = (\{mk_{\{i,j\}}\})_{j=0, j \neq i}^{n}$ for the first epoch.

In step 85, $SC2_i$ stores its backup data $backup_i$ as $backup_i \leftarrow (K_i, \{mk\}_i = (\{mk_{\{i,j\}}\})_{j=0, j \neq i}^{n})$. In step 86, $SC2_i$ supplies the initial key-share $K_i$ and the set of blinding seeds $\{s\}_i$ to the first server compartment $SC1_i$ as part of the state $st_i$:

set initial state of $SC1_i$ to $st_i = (K_i, \{s\}_i = (\{s_{\{i,j\}}\})_{j=0, j \neq i}^{n})$. The initialization of the authentication server 3 is then complete.

Figure 8:
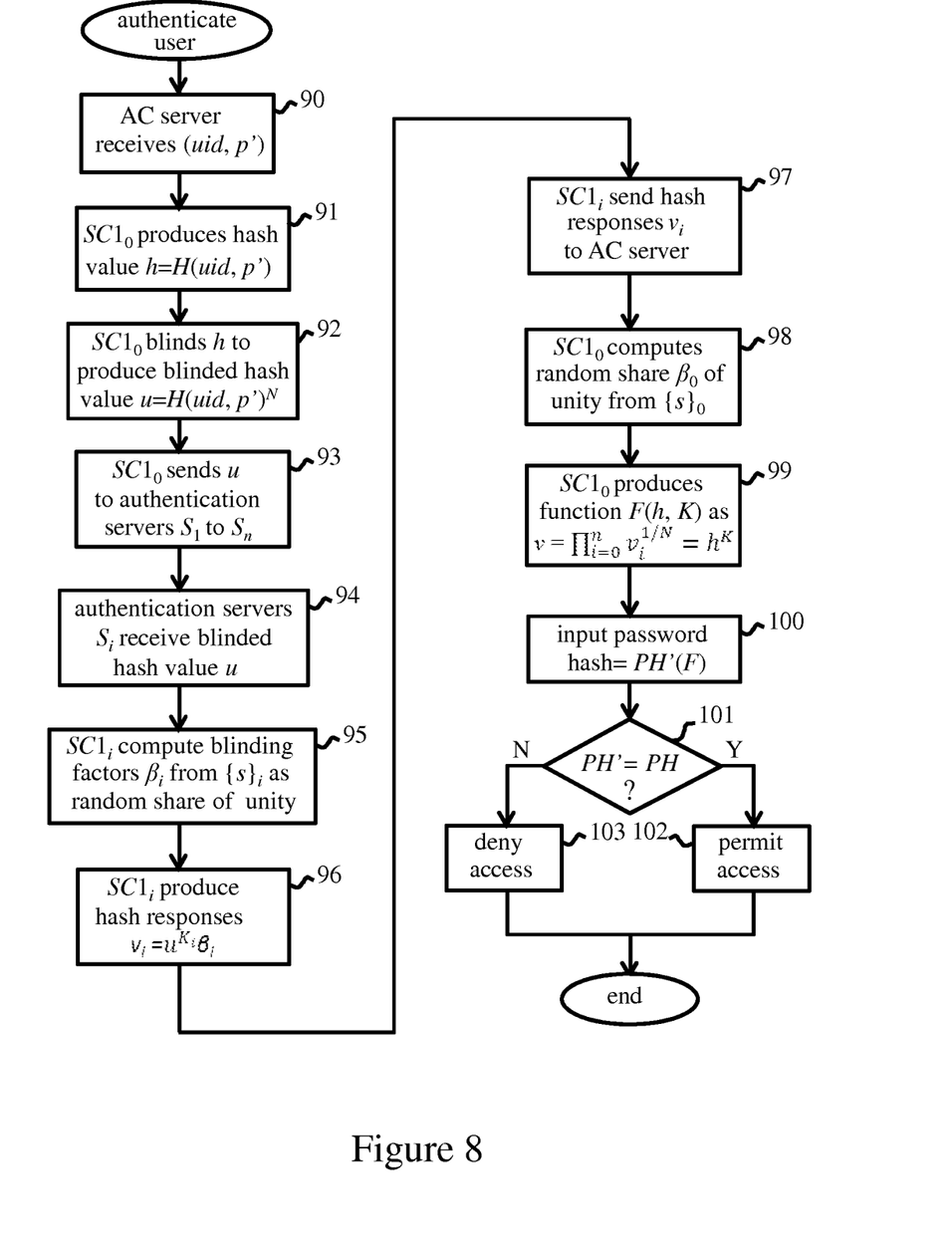
FIG. 8 indicates steps performed by servers in an authentication operation of the embodiment.

FIG. 8 indicates steps performed by the servers in an authentication operation of this embodiment. The authentication procedure begins in step 90 when the AC server $S_o$ receives a user's login data (uid, p') in step 90. In step 91, the first server compartment $SC1_o$ produces a hash value h as h=H(uid, p'). In step 92, $SC1_o$ computes the blinded hash value $u = h^N = H(uid, p')^N$ where N is a random nonce. In step 93, $SC1_o$ sends the blinded hash value u to each of the authentication servers $S_1, \ldots, S_n$.

The blinded hash value u is received by each authentication server $S_i$ (i=1 to n) in step 94. In step 95, the first server compartment $SC1_i$ of each authentication server produces a blinding factor $\beta_i$ which comprises a random share of a predetermined value, here unity, which is shared between the servers (here all servers $S_0$ to $S_n$) storing key-shares $K_i$. The blinding factor $\beta_i$ is produced from the set of blinding seeds $\{s\}_i = (\{s_{\{i,j\}}\})_{j=0, j \neq i}^{n}$ which are pseudorandom functions of respective master keys $mk_{i,j}$ here. The blinding factor $\beta_i$ thus comprises a function of the master keys $\{mk\}_i$ which are protected by second server compartment $SC2_i$. More specifically here, the blinding factor $\beta_i$ is computed, using the combinatorial secret sharing scheme above, as a combination of pseudorandom functions of respective master keys $mk_{i,j}$ via:

$$\beta_i \leftarrow \prod_{i=0, i \neq i}^{n} B(s_{[i,j]})^{\Delta_{i,j}}$$

where $\Delta_{i,j}$ is as defined above, i.e. $\Delta_{i,j}=1$ if $i<j$ or $\Delta_{i,j}=-1$ otherwise. B here represents a hash function (and may operate on further values, such as a session identifier, in addition to the blinding seed $s_{i,j}$ as indicated in the detailed implementation below).

Next, in step 96, the first server compartment $SC1_i$ of each authentication server $S_i$ produces its hash response $v_i$ as a function of the blinded hash value u, that server's key-share $K_i$, and the blinding factor. In this embodiment, the hash response $v_i$ is computed as $v_i = u^K \beta_i$. The hash responses $v_i$ of each authentication server $S_i$ are returned to AC server $S_0$ in step 97.

In step 98, the first server compartment $SC1_0$ of AC server $S_0$ computes its own random share $\beta_0$ of unity as:

$$\beta_0 \leftarrow \prod_{j=1}^{n} B[(s]_{[0,j]})$$

where $\Delta_{i,j}=1$ here as i=0. In step 99, $SC1_0$ then computes $v_0 = u^{K_0} \beta_0$ and computes v=F(h, K) as $$v = \prod_{i=0}^{n} v_i^{\frac{1}{N}} = \prod_{i=0}^{n} (u^{K_i}, \beta_i)^{\frac{1}{N}} = \prod_{i=0}^{n} u^{\frac{K_i}{N}} \cdot \prod_{i=0}^{n} \beta_i^{\frac{1}{N}}$$

$$= H(uid, p')^{\Sigma K_i} = h^K$$

since $\prod_{i=0}^{n} \beta_i = 1$.

The blinding factors $\beta_i$ thus combine to cancel in this computation.

In step 100, $SC1_0$ computes the input password hash PH' as PH'=G(uid, p', v)=G(uid, p', H(uid, p')$^{\Sigma K_i}$)=G(uid, p', $h^K$).

The subsequent steps 101 to 103 of FIG. 8 correspond respectively to steps 38 to 40 of FIG. 3 in which the input password hash PH' is compared with the user password hash PH for uid to determine if user access to the resource should be permitted or refused. The user password hash PH is produced in corresponding manner from the user password p registered for uid in a setup operation of this embodiment. The setup operation thus includes steps which correspond generally to steps 90 to 100 above to produce the user password hash PH from the user password p. The setup procedure also includes verification step 52 of FIG. 4 for verifying the function $F(h^0, K)$ produced in this procedure. Two examples of this verification step will be described below.

Since the blinding factors $\beta_i$ in the above scheme are random shares of a predetermined value, here unity, these blinding factors can be combined and eliminated in computation of the password hashes PH and PH'. This elegant mechanism allows hash responses to be blinded while preserving the overall result of the protocol and avoiding the need for servers to commit to their key-shares K. This offers security against transient corruptions over arbitrarily many key-refresh procedures as will now be described with reference to FIG. 9.

Figure 9:
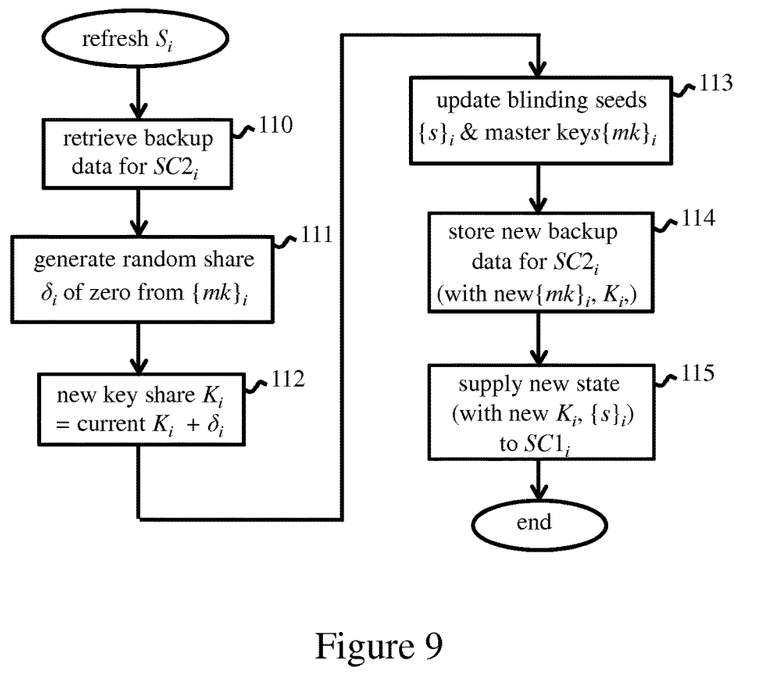
FIG. 9 indicates steps performed by servers in a refresh operation of the embodiment.

FIG. 9 indicates steps of the refresh procedure which is performed by all servers $S_0$ to $S_n$ in this embodiment for each successive epoch. In this process, the second server compartment $SC2_i$ of each server $S_i$ unilaterally generates a new key-share IC, for that server, and updates its master keys $\{mk\}_i$ and blinding seeds $\{s\}_i$. The servers $S_i$ synchronize to refresh simultaneously, e.g., by performing refreshes at regular time intervals, or by agreeing on refresh timing through out-of-band communication.

In step 110 of FIG. 9, the second server compartment $SC2_i$ retrieves its backup data backup$_i$, which includes its current key-share $K_i$ and master key-set $\{mk\}_i = (\{mk_{\{i,j\}}\}_{j=0, j \neq i}^{n}$, from memory. In step 111, $SC2_i$ generates a new random share $\delta_i$ of zero from its current master key set $\{mk\}_i$. This step uses the combinatorial secret sharing technique as before to compute $\delta_i$ as a combination of pseudorandom functions of respective master keys $mk_{i,j}$. In step 112, $SC2_i$ generates a new key-share for $S_i$ as a combination (in this example a sum) of the current key-share $K_i$ and the new random share $\delta_i$, i.e. set new key-share $K_i \leftarrow$ current key-share $K_i + \delta_i$. The new key-shares $K_i$ of all servers $S_i$ are thus independent of those in the previous epoch, but the sum $$\sum_{i=0}^{n} K_i = K$$

remains constant.

In step 113, $SC2_i$ updates the master keys $\{mk\}_i$ and blinding seeds $\{s\}_i$ for server $S_i$. The updated blinding seeds $\{s\}_i = (\{s_{\{i,j\}}\}_{i=0, j \neq i}^{n}$ are produced from respective master keys $mk_{i,j}$ of the current master key set $\{mk\}_i$. In this embodiment, each new blinding seed $s_{i,j}$ is produced as a pseudorandom function of a respective master key $mk_{i,j}$. Similarly, each master key is updated as a function, here a pseudorandom function, of that master key $mk_{i,j}$ for the preceding epoch. The resulting updated master keys constitute the master key set $\{mk\}_i = (\{mk_{\{i,j\}}\}_{j=0, j \neq i}^{n}$ for the new epoch.

In step 114, $SC2_i$ updates is backup data backup$_i$ to include the new key-share $K_i$, new set of master keys $\{mk\}_i$, and new set of blinding seeds $\{s\}_i$. In step 115, $SC2_i$ supplies the new key-share $K_i$ and the new blinding seeds $\{s\}_i$ to the first server compartment $SC1_i$ as part of the new state $st_i$ for the new epoch. The refresh process is then complete.

The refresh scheme allows key-shares to be unilaterally refreshed by each server, with refresh taking place in a secure environment provided by the second server compartment with access to trusted backup data. The system remains secure against offline dictionary attacks provided that not all A, servers in the system are compromised in the same epoch. Use of a fresh virtual machine for the first server compartment in each epoch conveniently eliminates any contamination of the first compartment due to server compromise in the preceding epoch. The blinding seeds $\{s\}_i$ which are used to compute the blinding factors $\beta_i$ are updated for each epoch, while the master keys $\{mk\}_i$ from which $\{s\}_i$ are calculated are protected by second server compartment $SC2_i$. Moreover, updating of the masters keys $\{mk\}_i$ additionally provides so-called "forward security" in the system.

That is, even if the backup data backup$_i$ of a server S$_i$ were to leak, then the adversary would still be unable to recompute all S$_i$'s past key-shares.

An exemplary implementation of the above system is described in detail in the following. In this construction, verification step 52 of FIG. 4 is implemented via a zero knowledge proof. Some preliminaries are described first.

Let $\kappa \in N$ be a security parameter. A polynomial-time algorithm A is an algorithm that takes $\kappa$ as an implicit input and that has running time bounded by a polynomial in $\kappa$. A function $v(\kappa)$ is said to be negligible if for every polynomial $p(\kappa)$ there exists a $\kappa' \in N$ such that $v(\kappa) < 1/p(\kappa)$ for all $\kappa > \kappa'$. For concrete security, one could typically use $\kappa=128$.

Pseudo-Random Generators. A pseudo-random generator (PRG) is a function PRG:D→R where no polynomial-time adversary can distinguish the output of PRG on a random input from a truly random string. The advantage $Adv_{A,PRG}^{pr}(\kappa)$ of an adversary A is defined as $|Pr[1=A(y):x\leftarrow_R D, y\leftarrow PRG(x)] - PR[1=A(y):y\leftarrow_R R_R]|$.

Message Authentication Codes. A message authentication code (MAC) is a function MAC:$\kappa \times \{0,1\}^x \to T$ that on input of a key $\mu$ and a message $m \in \{0,1\}^x$ returns a tag T. We say that MAC is unforgeable against chosen-message attack if all polynomial-time adversaries A have negligible advantage $Adv_{A,MAC}^{ufcma}(x)$ defined as $PR[T=MAC(\mu, m) \wedge m \notin Q: \mu \leftarrow R\kappa; (m, T) \leftarrow_R A^{MAC(\mu, \cdot)}]$, where Q is the set of messages that A submitted to its MAC($\mu,\cdot$) oracle.

Let G be a multiplicative group of prime order $q > 2^{2x}$ with generator g. Let H: $\{0,1\}^x \{0,1\}^x \to G$, G:$\{0,1\}^x \times \{0,1\}^x \to \{0,1\}^{2x}$, C:$Z_q \to \{0,1\}^{2x}$, B$_0$: $\{0,1\}^\kappa \times N \to G$, B$_1$:$\{0,1\}^\kappa \times N \to G$, B$_2$:$\{0,1\}^\kappa \times N \to G$, and B$_3$:$\{0,1\}^\kappa \times N \to Z_q$ be hash functions modelled as random oracles. Let PRG:$\{0,1\}^\kappa \to \{0,1\}^\kappa \times Z_q \times \{0,1\}^\kappa \times \{0,1\}^\kappa$ be a pseudo-random generator and MAC:$\{0,1\}^\kappa \times \{0,1\}^\kappa \to T$ be a message authentication code.

The protocol below provides AC server S$_0$ were with a shared MAC key $\mu_{\{0,i\}}$ with each server S$_i$, i=1 to n. Whenever the description below says that AC server S$_0$ sends m to S$_i$, this means that S$_0$ computes T←MAC($\mu_{\{0,i\}}$, m) and sends (m, T) to S$_i$. Similarly, when S$_i$ receives m from S$_0$, this means that S$_i$ receives (m, T) and checks that T=MAC($\mu_{\{0,i\}}$, m), ignoring the message m if that is not the case. The communication in the other direction from server S$_i$ back to S$_0$ is protected in the same way with the same MAC key $\mu_{\{0,i\}}$. Messages may also include appropriate servers IDs and session IDs which are omitted in the following for simplicity.

The state information st$_i$ of each server S$_i$, i=0 to n, contains a list of blinding seeds $(s_{\{i,j\}})_{j=0,j\neq i}^n$ that are used to generate random shares of the unity element in G or of zero in $Z_q$ using the combinatorial secret sharing scheme explained above. In each account creation or login session, the servers S$_i$ derive fresh shares $\eta_{i,0}, \ldots, \beta_{i,3}$ of unity or zero using the random oracles B$_0, \ldots,$ B$_3$ applied to s$_{\{i,j\}}$ and a sub-session identifier ssid, and use these shares as blinding factors for their protocol messages so that $$\prod_{i=0}^{n} \beta_{i,k} = 1 \text{ for } k = 0, 1, 2 \text{ and } \sum_{i=0}^{n} \beta_{i,z} = 0 \bmod q.$$

More precisely, S$_i$'s blinding factors are computed as $$\beta_{i,k} \leftarrow \prod_{j=0, j\neq i}^{n} B_k^{\bar{z}}(s_{\{i,j\}}^{\bar{z}}, ssid)^{\Delta_{i,j}} \text{ for}$$

$k = 0, 1, 2$ and as $\beta_{i,z} \leftarrow \prod_{j=0, j\neq i}^{n} \Delta_{i,j} B_3^{\bar{z}}(s_{\{i,j\}}^{\bar{z}}, ssid) \bmod q,$ where $\Delta_{i,j} = 1$ if $i < j$ or $\Delta_{i,j} = -1$ otherwise.

Initialization.

During initialization, all servers are uncorrupted and can communicate through the secure message transmission functionality F$_{smt}$.

AC Server S$_0$

For all $0 \leq i < j \leq n$, choose a master key mk$_{\{i,j\}} \leftarrow_R \{0,1\}^\kappa$.

For i=1, ..., n, securely send $(mk_{\{i,j\}})_{j=0,j\neq i}^n$ to server S$_i$ via F$_{smt}$. For all j=1, ..., n, compute (mk$_{\{0,j\}}$, d$_{\{0,j\}}$, s$_{\{0,j\}}$, $\mu_{\{0,j\}}$). The mk$_{\{0,j\}}$ output by this function constitute the updated master keys of step 76 of FIG. 6. The blinding seeds s$_{\{0,j\}}$ are thus computed (step 72 of FIG. 6) in the same step since all values mk$_{\{0,j\}}$, d$_{\{0,j\}}$, s$_{\{0,j\}}$, $\mu_{\{0,j\}}$ are taken from different portions of the output space of PRG. Choose master key K$\leftarrow_R Z_q$ and set public key L$\leftarrow g^K$. Compute initial key-share K$_0 \leftarrow$K +$\delta_0$ where $$\delta_0 = \sum_{j=1}^{n} d_{\{0,j\}} \bmod q$$

(where $\Delta_{i,j}=1$ here as i=0).

Store state st$_0 \leftarrow$(K$_0$, L, $(s_{\{0,j\}})_{j=1}^n$, $(\eta_{\{0,j\}})_{j=1}^n$) and store backup data backup$_0 \leftarrow$(K$_0$, L, $(mk_{\{0,j\}})_{j=1}^n$).

Authentication Servers S$_i$.

Receive $(mk_{\{i,j\}})_{j=0,j\neq i}^n$ from server S$_0$ via F$_{smt}$. For all j=0, ..., n, j≠i, compute (mk$_{\{i,j\}}$, d$_{\{i,j\}}$, s$_{\{i,j\}}$, $\mu_{\{i,j\}}$)←PRG(mk$_{\{i,j\}}$). Compute initial key-share K$_i \leftarrow \delta_i$ where $$\delta_i = \prod_{j=0, i\neq i}^{n} \Delta_{i,j} d_{\{i,j\}} \bmod q$$

and $\Delta_{i,j}$ as defined above.

Store state st$_i \leftarrow$(K$_i$, $(s_j\{i,j\})_j (j=0,j\neq t)'n$, $(\mu_j\{i,j\})_j(j=0,\neq i)'n)$ and store backup data backup$_i \leftarrow$(K$_i$, $(mk_{\{i,j\}})_{j=0,j\neq i}^n$).

Account Setup.

To create an account for user uid with password p, the AC server S$_0$ runs the following protocol with all n authentication servers S$_1$ to S$_n$.

AC Server S$_0$. The AC server sends a blinded password hash and a challenge hash to all servers.

Generate a random nonce N$\leftarrow_R Z_q$ and a random challenge c$\leftarrow_R Z_q$. Compute u=H(uid, p)$^N$ and ch=C(c).

Send (ssid, u, ch) to all S$_1$ to S$_n$, where ssid is a sub-session identifier.

Store (uid, p, N, u, c) associated with ssid.

Authentication Servers S$_i$. Each server sends a blinded hash response using its secret key-share and the blinded first move of a zero-knowledge proof.

Compute $v_i \leftarrow u^{K_i} \beta_{i,0}$, where $\beta_{i,0} = \prod_{j=0, j\neq i}^{n} B_0^{\bar{z}}(s_{\{i,j\}}^{\bar{z}}, ssid)^{\Delta_{i,j}}$.

-continued

Compute $R_{1,i} \leftarrow g^{r_i} \cdot \prod_{j=0, j\neq i}^{n} B_1^{\xi_2(s_3^\xi_{[i,j]}, ssid)^{\Delta_{i,j}}}$ and $R_{2,i} \leftarrow u^{r_i} \cdot \prod_{j=0, j\neq i}^{n} B_2^{\xi_2(s_3^\xi_{[i,j]}, ssid)^{\Delta_{i,j}}}$ where $r_i \leftarrow_E \mathbb{Z}_q$.

Respond by sending (ssid, $v_i$, $R_{1,i}$, $R_{2,i}$) to $S_0$.
Store ($r_i$, ch) associated with ssid.
AC Server $S_0$. The AC server sends the challenge for the zero knowledge proof.
On receiving (ssid, $v_i$, $R_{1,i}$, $R_{2,i}$) from all servers $S_1$ to $S_n$, retrieve (uid, p, N, u, c) associated with ssid.
Update the information stored with ssid to (uid, p, N, u, c, $(v_i, R_{1,i}, R_{2,i})_{i=1}^{n}$)). end (ssid, c) to all servers $S_1$ to $S_n$.
Authentication Servers $S_i$. Each server checks the challenge hash from the previous round and sends the blinded last move of a zero-knowledge proof.
On receiving (ssid, c) from $S_0$, retrieve ($r_1$, ch) associated with ssid. Abort if it does not exist. If C(c)≠ch, abort.

Compute $s_i \leftarrow K_i c + r_i + \sum_{j=0, j\neq i}^{n} \Delta_{i,j} B_3^{\xi_2(s_3^\xi_{[i,j]}, ssid)} \bmod q$.

Respond by sending (ssid, $s_i$) to $S_0$. Remove all information associated to ssid.
AC Server $S_0$. The AC server verifies the aggregated server responses through the zero knowledge proof and computes the user password hash.
On receiving (ssid, $s_i$) from all servers $S_1$ to $S_n$, retrieve (uid, p, N, u, c, $(v_i, R_{1,i}, R_{2,i})_{i=1}^{n}$) stored for ssid. Abort if it does not exist.

Compute $v_0 \leftarrow u^{K_0} \cdot \prod_{j=1}^{n} B_0^{\xi_2(s_3^\xi_{[0,j]}, ssid)}$.

Choose $r_0 \leftarrow n \mathbb{Z}_q$, compute $R_{1,0} \leftarrow g^{r_0} \cdot \prod_{j=1}^{n} B_1^{\xi_2(s_3^\xi_{[0,j]}, ssid)}$ and $R_{2,0} \leftarrow u^{r_0} \cdot \prod_{j=1}^{n} B_2^{\xi_2(s_3^\xi_{[0,j]}, ssid)}$.

Also compute $s_0 \leftarrow K_0 c + r_0 + \sum_{j=1}^{n} \Delta_{i,j} B_3^{\xi_2(s_3^\xi_{[0,j]}, ssid)} \bmod q$.

Compute $v \leftarrow \prod_{i=0}^{n} v_i^{\frac{1}{N}}$, $R_1 \leftarrow \prod_{i=0}^{n} R_{1,i}$, $R_2 \leftarrow \prod_{i=0}^{n} R_{2,i}$ and $s \leftarrow \sum_{i=0}^{n} s_i \bmod q$.

Verify that $g^s = L^c R_1$ and $u^s = v^{Nc} R_2$ and if not abort. This concludes the zero knowledge proof corresponding to verification step 52 of FIG. 4.
Store PH=G(uid, p, v) as the user password hash for uid. Remove all information associated to ssid.

User Login

The login protocol is a simplified version of account setup, without zero knowledge proof.

AC Server $S_0$. The AC server sends a blinded hash value to all servers. On receipt of an input password p' for user uid, generate a random nonce $N \leftarrow_R \mathbb{Z}_q$ and compute u=H(uid, p')$^N$. Send (ssid, u) to all $S_1$ to $S_n$, where ssid is a sub-session identifier. Store (uid, p', N, u) associated with ssid.

Authentication Servers $S_i$. Each server sends a blinded hash response using its secret key-share.

On receiving (ssid, u) from $S_0$, compute $v_i = u^{K_i} \beta_{i,0}$, where $\beta_{i,0} \leftarrow \prod_{j=0, j\neq i}^{n} B_0^{\xi_2(s_3^\xi_{[i,j]}, ssid)^{\Delta_{i,j}}}$.

Respond by sending (ssid, $v_i$) to $S_0$.
AC Server $S_0$. The AC server verifies the recomputed input password hash PH' against the stored user password hash PH.
On receiving (ssid, $v_i$) from all servers $S_1$ to $S_n$, retrieve (uid, p', N, u) associated to ssid. Abort if it does not exist.

Compute $v_0 \leftarrow u^{K_0} \cdot \prod_{j=1}^{n} B_0^{\xi_2(s_3^\xi_{[0,j]}, ssid)^{\Delta_{0,j}}}$ and $v \leftarrow \prod_{i=0}^{n} v_i^{\frac{1}{N}}$.

If PH=G(uid, p', v) then permit user access to the resource. Otherwise refuse access. Delete the stored tuple (uid, p', N, u) associated to ssid.

Refresh.

Servers $S_i$, i=0 ton. Based on its backup backup, and current state $st_i$, $S_i$ computes its new state.
If $S_i = S_0$, recover backup$_0$=($K_0$, L, $(mk_{\{o,j\}})_{j=1}^n$), and if $S_i = S_1$ to $S_n$, recover backup$_i$=($K_i$, $(mk_{\{i,j\}})_{j=0,j\neq i}^n$).
For all j=0, . . . , n, j≠i, compute ($mk_{\{i,j\}}$, $s_{\{i,j\}}$, $\mu_{\{i,j\}}$)←PRG ($mk_{\{i,j\}}$) and compute the new key-share $K_i$←current key-share $K_i + \delta_i$, where $\delta_i = \sum_{j=0, j\neq i}^{n} \Delta_{i,j} d_{[i,j]} \bmod q$.

If $S_i = S_0$, store new backup data backup$_0$=($K_0$, L, $(mk_{\{0,j\}})_{j=1}^n$) and set the new state $st_0$←($K_0$, L, $(s_{\{0,j\}})_{j=1}^n$, $(\mu_{\{0,j\}})_{j=1}^n$).
If $S_i = S_1$ to $S_n$, store new backup data backup$_i$←($K_i$, $(mk_{\{i,j\}})_{j=0,j\neq i}^n$) and set the new state $st_i$=($K_i$, $(s_{\{i,j\}})_{j=0,j\neq i}^n$, $(\mu_{\{i,j\}})_{j=0,j\neq i}^n$).

The above scheme offers a simple and highly efficient proactively secure password authentication protocol which rules out dictionary attacks unless all servers are corrupted during the same epoch. A corrupt AC server only sees the passwords of user accounts that are created or logged into during the corruption. No passwords, password hashes, or any other offline-attackable information is leaked for accounts that are inactive during the corruption. This provides good protection against "smash-and-grab" attacks and short-term corruptions. Login, i.e., password verification, is a single-round protocol requiring just one exponentiation in a prime-order group on each server (two for the AC server), which is essentially optimal for schemes with public-key operations. The recovery and key refresh procedure is non-interactive and only involves a couple of additions and pseudorandom function evaluations per server, making it more than efficient enough to perform preventively on a regular basis instead of just after a detected breach.

An alternative construction, which is even more efficient, is described in the following. It is almost identical to the construction above except that the zero knowledge proof for implementing verification step 52 of FIG. 4 is replaced by a pairing computation by the AC server.

Let $G_1$, $G_2$, $G_t$, be multiplicative groups of prime order q with generators $g_1$, $g_2$, $g_t$ respectively, and an efficiently computable pairing function e:$G_1 \times G_2 \to G_t$, Let H:$\{0,1\}^x \times \{0,1\}^x \to G_1$, G:$\{0,1\}^x \times \{0,1\}^x \times G_1 \to \{0,1\}^{2\kappa}$ and $B_0$:$\{0,1\}^\kappa \times N \to G_1$ be hash functions modelled as random oracles. Initialization, login, and refresh are identical to the discrete-logarithm scheme above, except that $L \leftarrow g_2^K$ and that group operations during login take place in $G_1$. Account setup is considerably simpler, as the two-round zero-knowledge protocol is now replaced with a pairing computation.

Account Setup.

To create an account for user uid with password p, the AC server $S_0$ runs the following protocol with all n authentication servers $S_1$ to $S_n$.

AC Server $S_0$. The AC server sends a blinded password hash to all servers. Compute u=H(uid, p)$^N$ and send (ssid, u) to all $S_1$ to $S_n$. Store (uid, p, N, u) associated with ssid.

Authentication Servers $S_i$. Each server sends a blinded hash response using its secret key-share.

Compute $v_i = u^{K_i} \beta_i$, where $\beta_i \leftarrow \prod_{j=0, j \neq i}^{n} B_\Sigma^\Sigma (s_\Sigma^\Sigma{}_{[i,j]}, ssid)^{\Delta_{i,j}}$.

Respond by sending (ssid, $v_i$) to $S_0$.

AC Server $S_0$. The AC server verifies the server contributions and computes the user password hash PH.

On receiving (ssid, $v_i$) from all servers $S_1$ to $S_n$, retrieve (uid, p, N, u) stored for ssid. Abort if it does not exist.

Compute $v_0 \leftarrow u^{K_0} \cdot \prod_{j=1}^{n} B_\Sigma^\Sigma (s_\Sigma^\Sigma{}_{[0,j]}, ssid)^{\Delta_{0,j}}$ and $v \leftarrow \prod_{i=0}^{n} v_i^{\frac{1}{N}}$.

Verify that e(v, $g_2$)=e(H(uid, p), L). If not, abort.
Store PH=G(uid, p, v) as the user password hash for uid.
Remove all information associated to ssid.

The above scheme based on bilinear maps offers single-round account setup with one exponentiation per authentication server, and one exponentiation and one pairing computation for the AC server.

Many changes and modifications can of course be made to the exemplary embodiments described above. For example, while the above examples describe n-out-of-n schemes in which all key-shares $K_i$ are used to reconstruct the shared key K, embodiments based on t-out-of-n (threshold) schemes can be envisaged. For instance, Shamir's secret sharing scheme allows a secret key K∈G to be shared among a set of servers $S_1, \ldots, S_n$ so that any subset of size t can recover K. Shamir's approach underlies almost all practical t-out-of-n threshold cryptography schemes. The dealer (e.g., $S_1$) chooses a random polynomial f(x) of degree t−1 such that f(0)=K, for example, by choosing random coefficients $\alpha_1, \ldots, \alpha_{t-1} \leftarrow_R G$ and letting f(x)= K+$\alpha_1$x+ . . . +$\alpha_{t-1}$x$^{t-1}$. The dealer hands $S_i$ its key share $K_i$=f(i). Given t different points (i, $K_i$) of the polynomial for $S_i \subseteq \{1, \ldots, n\}$, #S=t, one can use Lagrange interpolation to reconstruct the polynomial as $$f(x) = \Sigma_i (i \in S) \equiv \Pi_i (j \in S \setminus \{i\}) \equiv [\![ (x-j)/(i-j)_i ]\!]$$

and therefore recompute the key K=f(0) as $$K = \sum_{i \in S} \lambda_{S,i} K_i$$

where $\lambda_{s,i}$ are the Lagrange coefficients $\lambda_i(S,i)$= $\Pi_i(j \in S \setminus \{i\}) \equiv [\![ j(j-i) ]\!]$.

Various other server implementations can also be envisaged. For example, the data (master keys, etc.) generated by $S_0$ in the above schemes could be written to a secure device such as a smart card, HSM (Hardware Security Module), TPM (Trusted Platform Module) or similar device which is then distributed to the other servers. This device may then also implement the required functionality of the second server compartment $SC2_i$. Embodiments might also be envisaged where the second server compartment $SC2_i$ is implemented by a hypervisor controlling operation of one or more virtual machines providing the first server compartment $SC1_i$.

As further examples, the master keys need not be updated for successive epochs in schemes without forward security. In some embodiments, the verification step corresponding to step 52 of FIG. 4 may be omitted. The schemes can also be modified to accommodate shared values which are constants other than unity or zero in calculating the blinding factors and key-shares. In general, functions indicated in blocks of the flow charts may occur out of the order noted in the figures.

The resource protected by access control server 2 may in general comprise any resource to which user access is restricted, e.g. an application, service, data, device, network or any other facility or combination of facilities.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system of λ≥2 servers comprising an access control server for communication with user computers via a network and controlling access by the user computers to a resource in dependence on authentication of user passwords associated with respective user IDs, and a set of authentication servers for communication with the access control server via the network, wherein λ is a number of virtual machines implementing the access control server and the set of authentication servers communicating over the network to implement an authentication protocol and, wherein:
    at least each authentication server stores a respective key-share $K_i$ of a secret key K which is shared between a plurality of the λ servers, wherein i=1 to n and n is the number of authentication servers, said secret key K being reconstructed by a combination of each key share $K_i$ and a key-share $K_0$, where $K_0$ is a key-share stored at said access control server;

the access control server is adapted, in response to receipt from a user computer of a user ID and an input password, to produce a hash value h via a first hash function operating on the input password, to blind the hash value h to produce a blinded hash value u, and to send the blinded hash value u via the network to at least a subset of the set of authentication servers;

each authentication server is adapted, in response to receipt of the blinded hash value u, to produce a hash response $v_i$ from the blinded hash value u and that server's key-share $K_i$, and to send the hash response $v_i$ via the network to the access control server; and the access control server is adapted to use control logic to compute, using the hash response $v_i$ from each authentication server i of said n authentication servers, an input password hash comprising a predetermined function F of said hash value h and said secret key K, the control logic computing a product of each hash response $v_i$ to produce said predetermined function F, and to compare the input password hash with a corresponding user password hash, produced from said user password for the received user ID and pre-stored by the access control server, to determine whether said input password equals the user password, if so permitting access to the resource by the user computer.

2. The system as claimed in claim 1 wherein the access control server is adapted to send the blinded hash value u to each authentication server of said set.

3. The system as claimed in claim 1 wherein each authentication server is adapted such that said hash response $v_i$ comprises a function of the blinded hash value u, that server's key-share $K_i$, and a blinding factor $\beta_i$ which comprises a random share of a predetermined value which is shared between said plurality of servers storing respective key-shares $K_i$.

4. The system as claimed in claim 3 wherein said predetermined value equals 1.

5. The system as claimed in claim 4 wherein the hash response $v_i$ comprises the function $u^{K_i}\beta_i$.

6. The system as claimed in claim 3 wherein each server $S_i$ storing a key-share $K_i$ is adapted to update the key-share $K_i$ for each of successive time periods in operation of the system.

7. The system as claimed in claim 3 wherein each server $S_i$ storing a key-share $K_i$ also stores a set of master keys which comprises a respective master key $mk_{i,j}$ common to each other server $S_j$, $j \neq i$, storing a key-share $K_j$, and wherein said blinding factor $\beta_i$ comprises a function of said set of master keys.

8. The system as claimed in claim 7 wherein more than two servers store respective key-shares $K_i$ and wherein said blinding factor $\beta_i$ comprises a combination of pseudorandom functions of respective master keys.

9. The system as claimed in claim 7 wherein each server $S_i$ storing a key-share $K_i$ is adapted to update each master key $mk_{ij}$ for each of successive time periods in operation of the system, the updated master key comprising a function of that master key $mk_{ij}$ for the preceding time period.

10. The system as claimed in claim 7 wherein each server $S_i$ storing a key-share $K_i$ comprises:

a first server compartment, connectable to the network, which stores the key-share $K_i$ and a set of blinding seeds, wherein each blinding seed comprises a pseudorandom function of a respective master key $mk_{i,j}$; and a second server compartment, inaccessible from the network in operation of the system, which stores said set of master keys;

wherein the second server compartment is adapted to produce each blinding seed from a master $mk_{i,j}$ and to supply the blinding seed to the first server compartment, and wherein the first server compartment is adapted to produce said blinding factor $\beta_i$ from the set of blinding seeds.

11. The system as claimed in claim 10 wherein the second server compartment is adapted to update each blinding seed for each of successive time periods in operation of the system, and to supply the set of updated blinding seeds for that time period to the first server compartment.

12. The system as claimed in claim 1 wherein the access control server is adapted to produce the input password hash via a second hash function operating on said predetermined function of the hash value h and secret key K.

13. The system as claimed in claim 1 wherein said secret key K comprises the secret key of a cryptographic key-pair (L, K) where L is the public key of the key-pair, wherein the access control server stores the public key L, and wherein, in a setup operation for a said user ID:

the access control server is adapted, in response to initial input of the user ID and associated user password in the setup operation, to produce an initial hash value $h^0$ via a first hash function operating on the user password, to blind the initial hash value $h^0$ to produce a blinded initial hash value $u^0$, and to send the blinded initial hash value $u^0$ via the network to at least a subset of the set of authentication servers;

each authentication server is adapted, in response to receipt of the blinded initial hash value $u^0$ in the setup operation, to produce an initial hash response $v_i^0$ from the blinded initial hash value $u^0$ and that server's key-share $K_i$, and to send the initial hash response $v_i^0$ via the network to the access control server; and the access control server is adapted to use control logic to compute, using the initial hash response $v_i^0$ from each authentication server, a predetermined function F of said initial hash value $h^0$ and said secret key K, the control logic computing a product of each initial hash response $v_i^0$ to produce said predetermined function F, to verify a correctness of the secret key K in that function using said public key L, and to store said user password hash comprising that function.

14. The system as claimed in claim 13 wherein the access control server is adapted to verify a correctness of the secret key K by communicating with at least said subset of the authentication servers to implement a zero-knowledge proof using the public key L.

15. The system as claimed in claim 13 wherein the access control server is adapted to verify a correctness of the secret key K by verifying that the public key L and said predetermined function of the initial hash value $h^0$ and secret key K satisfy a bilinear map.

16. A method for controlling access by user computers to a resource in dependence on authentication of user passwords, associated with respective user IDs, at an access control server, the access control server being one of $\lambda \geq 2$ servers that includes a set of authentication servers, and wherein $\lambda$ is a number of virtual machines implementing the access control server and the set of authentication servers communicating over the network to implement an authentication protocol, the access control server being adapted for communication via a network with the user computers and the set of authentication servers, wherein at least each authentication server stores a respective key-share $K_i$ of a secret key K which is shared between a plurality of the λ servers, wherein i=0 to n and n is the number of authentication servers, said secret key K being reconstructed by a combination of each key share K, the method comprising, at the access control server:
   in response to receipt from a user computer of a user ID and an input password, producing a hash value h via a first hash function operating on the input password, blinding the hash value h to produce a blinded hash value u, and sending the blinded hash value u via the network to at least a subset of the set of authentication servers;
   receiving via the network, from each of at least said subset of the authentication servers, a hash response vi produced from the blinded hash value u and that server's key-share $K_i$; and
   producing using control logic to compute, using the hash response $v_i$ from each authentication server i of said n authentication servers, an input password hash comprising a predetermined function F of said hash value h and said secret key K, the control logic computing a product of each hash response $v_i$ to produce said predetermined function F, comparing the input password hash with a corresponding user password hash, produced from said user password for the received user ID and pre-stored by the access control server, to determine whether said input password equals the user password, and if so permitting access to the resource by the user computer.

17. A server comprising a non-transitory storage medium, a communications interface, and control logic adapted to configure the server to implement an access control server of a system as claimed in claim 1, wherein said storage medium stores said user password hash for each user ID.

18. A server comprising a non-transitory storage medium, a communications interface, and control logic adapted to configure the server to implement an authentication server of a system as claimed in claim 1, wherein said storage medium stores said respective key-share $K_i$ of said secret key K.

19. A server comprising a non-transitory storage medium, a communications interface, and control logic adapted to configure the server to implement an authentication server of a system as claimed in claim 3, wherein said storage medium stores said respective key-share $K_i$ of said secret key K.

* * * * *